Aug. 9, 1927.
E. A. SPERRY
1,638,417
SHIP'S SIGNALING OR BROADCASTING DEVICE
Filed Nov. 6, 1923    2 Sheets-Sheet 1
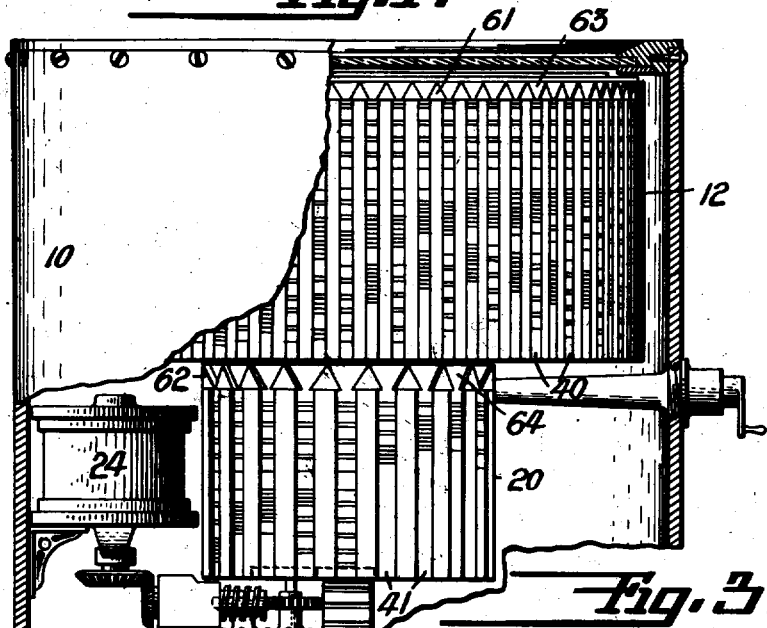
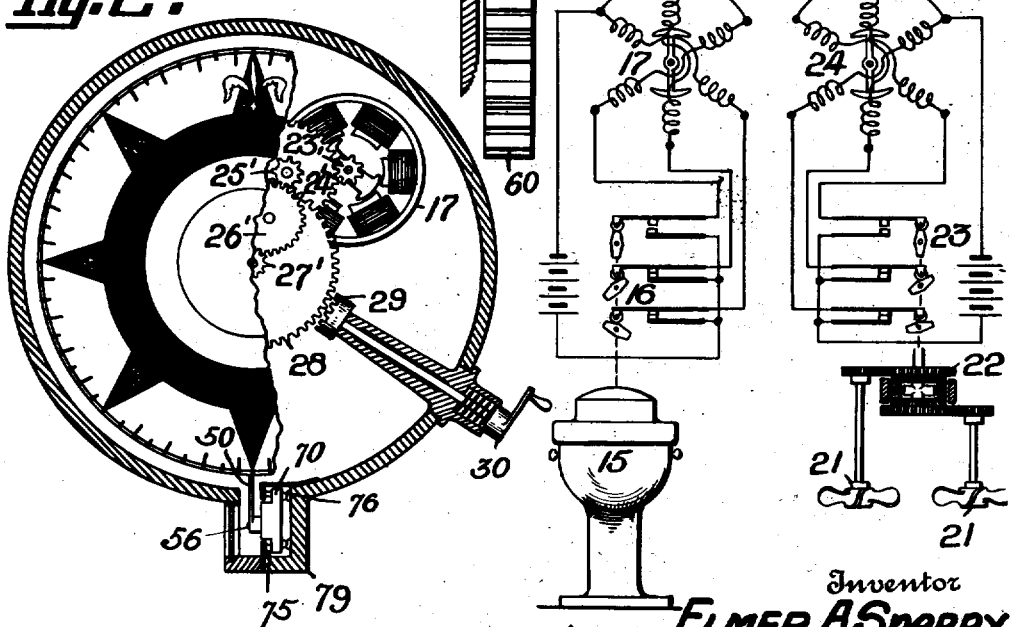
Inventor
ELMER A. SPERRY.
By his Attorney
Herbert H. Thompson Aug. 9, 1927. 1,638,417
E. A. SPERRY
SHIP'S SIGNALING OR BROADCASTING DEVICE
Filed Nov. 6, 1923 2 Sheets-Sheet 2
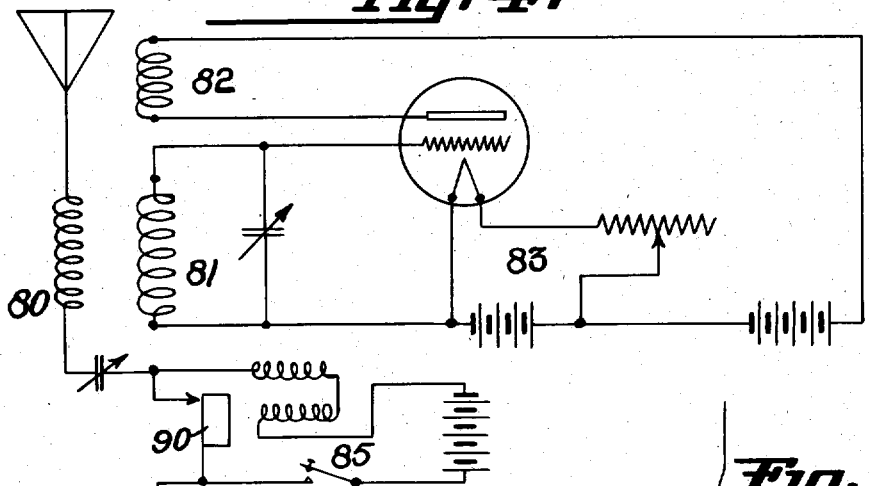
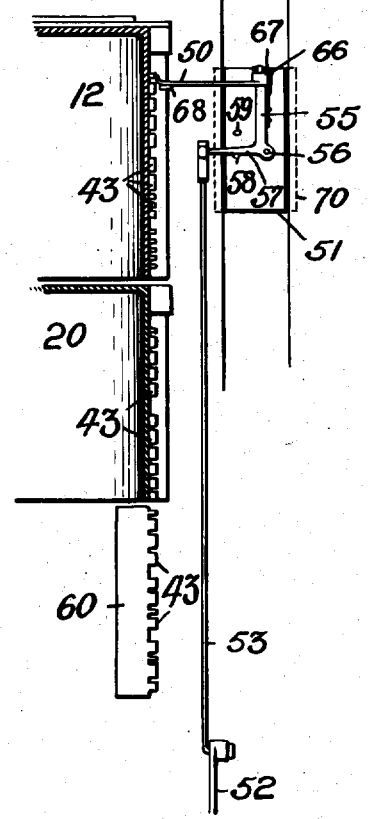
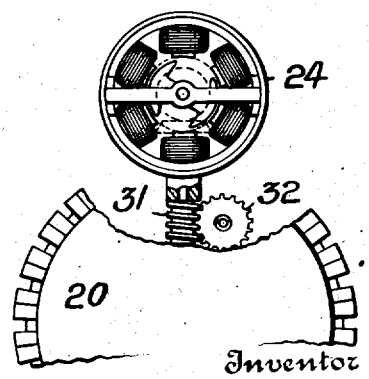
Inventor
ELMER A. SPERRY.
By his Attorney
Herbert H. Thompson Patented Aug. 9, 1927.

1,638,417

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

SHIP'S SIGNALING OR BROADCASTING DEVICE.

Application filed November 6, 1923. Serial No. 673,210.

This invention relates to signalling means or systems, more especially of the type adapted to be employed upon dirigible craft, such as ships. The invention has for its principal object the automatic transmission of suitable signals or information from one ship to another which is unaffected by adverse weather conditions.

I am aware that in foggy weather many ships now send out wireless signals, so that other ships may ascertain their position by means of the radio-direction finder. Such a system does not, however, advise other ships as to the course of the sending vessel, or its speed or name, so that the receiving ship is not able to tell accurately what course to take to avoid a collision. By my invention, I propose to remedy this defect by providing automatic means for transmitting from one ship to another which is unaffected by adverse weather conditions.

Another object of my invention is the provision of a signaling system for the purpose described which is adapted to transmit a signal or group of signals periodically.

A further object of my invention is the provision of wireless signaling means for accomplishing the above mentioned functions. Such means is particularly adapted for use in connection with a radio direction finder, such as that disclosed in the application of Martin L. Patterson, Ser. No. 640,423, filed May 21, 1923, for example, whereby the position of a transmitting ship with respect to the receiving ship, as well as its course may be readily determined at one end the same time and from the same signals.

Other objects and advantages of this invention will become apparent in the course of the following detailed description of the invention.

In the accompanying drawings;

Fig. 1 is a front elevation, partly sectioned vertically and with parts broken away of an instrument forming part of my signal transmitting means.

Fig. 2 is a plan view, partly sectioned horizontally and with parts broken away of the device shown in Fig. 1.

Fig. 3 is a view largely diagrammatic, showing means for driving the plurality of repeater elements from various movable elements.

Fig. 4 is a wiring diagram of a suitable wireless transmitting circuit.

Fig. 5 is a vertical section through a portion of Fig. 1 showing the movable contact and the cooperating fixed contacts controlling the transmission of signals.

Fig. 6 is a view of a detail of the movable contact mechanism shown in Fig. 5, turned through 90 degrees.

Fig. 7 is an enlarged view of a detail of the mechanism shown in Fig. 5 for insuring engagement between the movable contact and the fixed contacts.

Fig. 8 is a plan view with parts broken away showing the means for driving one of the repeater elements.

Referring to Fig. 1 of the drawings, there is shown an instrument, designated generally at 10, in the form of a casing enclosing one or more repeater elements, depending upon the nature of the signals to be transmitted. In the present case the invention is illustrated in connection with the transmission of signals indicating the ship's course, the ship's speed and the ship's call. It will be understood however, as will become apparent from the following description of the invention, that any other suitable information may be transmitted, or that only the ship's course could be transmitted, if a simple instrument were desired.

In the present case I provide, therefore, elements within the instrument 10 which are adapted to be actuated in accordance with the ship's course and speed. Since the ship's call is always the same, this element is fixed and is not controlled from any other source. If information is to be transmitted relating to the ship's movements, other than speed and direction, elements will be provided within the instrument 10 movable in accordance with said other movements. If the information concerns a constant factor of the ship, such control from a distance is not necessary.

Within the instrument 10 I provide therefore, an element 12 which is rotatable in accordance with the heading of the ship, as by being operated from a gyroscopic compass 15 through a transmitter 16 which operates repeater motor 17 in the usual manner, said repeater motor driving the repeater element 12. Within the instrument 10 and positioned preferably below the course indicator or cord 12 is a speed responsive device or repeater 20 adapted to be actuated from the propellers 21 of the vessel through a differential 22, for averaging the speed of the several propellers, by means of a transmitter 23 and repeater motor 24 which drives said speed repeater 20. The driving mechanism between the motor 24 and speed repeater 20 may comprise gearing indicated in part by numerals 31, 32 adapted to drive some suitable speed integrating device, or tachometer, to the indicating shaft of which the repeater 20 is fixed so that its movements correspond to the speed of the ship (a function of the propeller speed). As these integrating devices are old in the art no details have been shown. Any suitable gearing may be interposed between the repeater 17 and the course repeater 12, such for example as that shown in Fig. 2 and designated by the numerals 23' to 27' inclusive. A gear 28 may be provided to be engaged by a crown gear 29 which may be operated to effective or ineffective position to permit setting of the course repeater in synchronism with the master compass by means of a handle 30.

While the course and speed-responsive mechanisms have been described as acting automatically it is understood that they may be hand-operated, i. e., set by hand in accordance with readings taken by some other instrument.

The axes of the repeaters 12 and 20 are so positioned relative to each other, that the periphery of the repeater 20 is substantially within the periphery of repeater 12, but tangential thereto (in plan) so that one point thereof is directly beneath the repeater 12, as shown in Fig. 5. In this manner a line upon the repeater 12 will always be in alignment with a line upon the repeater 20, and this aligned position is utilized for the transmission of signals.

Each repeater is formed with a cylindrical downwardly extending portion subdivided into equally spaced longitudinal grooves 40, 41, in which grooves are formed means for the transmission of distinctive signals. As shown, a series of contacts 43, both long and short, corresponding to dots and dashes of a telegraphic code are formed on the cylinders in vertical rows. It will be apparent that if a contact member is moved in one of said grooves over said contacts, and if said contacts form part of a transmitting circuit, said circuit will be closed for short or long periods, corresponding to the short or long contacts within the groove to transmit short or long signals, or a combination of such signals as the movable contact operates over the relatively fixed contact. Operating in said grooves is a movable contact member 50 carried on a carriage 51 adapted to be reciprocated by a suitable crank and linkage 52, 53, or other means, from a source of power such as a motor or clock mechanism to raise and lower the contact member 50 periodically.

It may be found desirable to provide means whereby the movable contact 50 will engage the contacts 43 in the longitudinal grooves only during one stroke of each reciprocation, returning idly on the second stroke of the reciprocation so that a dead period occurs between each periodic transmission of the signals. For this purpose I mount the movable member upon an arm of a bell-crank 55 pivoted at 56 on the carriage 51, the other arm 57 of said bell-crank being connected to the link 53 and adapted to operate between stops 58 and 59. On the down stroke, link 53 will rotate the bell-crank in a counter-clockwise direction until arm 57 engages stop 58, at which time movable contact 50 will be in engagement with the relatively fixed contacts 43 throughout the down stroke. On the up stroke, link 53 will rotate the bell-crank until arm 57 engages stop 59 at which time movable contact 50 will clear the contacts 43 so that no signal will be transmitted during the up stroke.

By positioning the repeater 20, as hereinbefore described, so that its periphery is tangential to the periphery of repeater 12, and therefore at one point is in direct vertical alignment with the repeater 12, the movable contact 50 may be caused to operate in a groove 40 of repeater 12 and in a groove 41 of repeater 20 during the same stroke.

I further provide a member 60 in vertical alignment with the points of alignment of repeaters 12 and 20 and provided with contacts 43 corresponding to the ship's call, so that the movable contact 50 on its effective stroke may cause transmission not only of the course and speed signals, but also the ship's call. The members 12 and 20 are of course actuated in accordance with the position of the vessel and its speed respectively, so that movable contact 50 will engage in that groove 40 or 41 which is at the time in cooperating position therewith. Since the ship's call is at all times the same, it is fixed in position in cooperative relation to the movable contact 50.

Since the repeater elements have many more positions than it is practicable to provide signal grooves, it may occur that the movable contact 50 will commence its stroke at a position intermediate between two grooves 40 or 41 and since such intermediate portion is a projecting portion, the contact 50 will be unable to descend. To insure engagement of the movable contact 50 in a groove 40 or 41 at the beginning of its effective stroke, each repeater element 12 and 20 is provided with a notched member 61, 62, respectively, the apexes of the notches being positioned upwardly, so that the movable contact 50 will not tend to rest thereon, and the depressions 63, 64 between adjacent notches leading into a groove 40, 41 respectively. The notches will at times cause camming of the movable contact 50 laterally to one side or the other and to permit such movement, the movable contact 50 is pivotally mounted on the end of arm 55 for movement about a substantially vertical axis, the contact being held centralized however, by means such as a flat spring 66 engaging the flat rear surface 67 of said movable contact arm. The contact arm 50 may be provided with a knife edge 68 on its lower side to facilitate entry thereof into the notches.

To avoid the possibility of the movable contact 50 resting squarely upon the apex of one of the triangular projections of notched portion 61, or 62, and thus prevent lowering of the movable contact, I provide for a vibratory lateral movement of said contact 50 as it approaches said apexes (see Fig. 7). For this purpose, the carriage 51 is provided with flanges 70 operating between guide members 72, 73, and a leaf spring 75 positioned between each flange 70 and the guide 73. On one side of said carriage 51 I provide a plurality of detents 76 adapted to operate over a plurality of sharp notched grooves 77 in the adjacent guide wall 72, so that as the carriage 51 is lowered, said detents operating over said sharp grooves and notches 77, will give a vibratory lateral movement to said carriage 51 and obviate any possibility of contact 50 coming to rest upon the apex of the projections on the notched member 61 or 62. The notches 77 may be provided only in the vicinity of the apexes.

To prevent movement of the repeater drums in response to variations in course and speed during the transmission of a signal, locking means may be employed. Said locking means may be adapted to be rendered effective at the beginning of a signal transmission and may take the form of a member movable into and out of notches 63, 64. A yieldable, resilient connection may be provided between the repeater motors and their respective drums to permit the drums to lag until the signal is transmitted and then to catch up with their motors.

The longitudinal grooves 40, 41 of the repeater members may designate any suitable intervals of course and speed respectively, and the code signal in the respective groove 40, 41 would correspond to said designation. Thus the grooves 40 may designate course in 5 degree intervals, so that when the contact member 50 operates in one of said grooves, it would, for example, transmit the reading 35 degrees and when operating in the next adjacent groove, transmit the reading 40 degrees. Similarly, the grooves 41 may transmit signals or readings in knots, adjacent grooves indicating for example one or two knot intervals. It is thus apparent that on each downward stroke of the movable contact 50, there will be transmitted a set of signals which in this case will include, first, a designation of the ship's course in azimuth, second, the ship's speed in knots, and third, the ships's call as carried by the member 60. This set of signals will be repeated periodically as the contact arm 50 is reciprocated, the same set of signals being transmitted each time, unless either the course or speed, or both, change, in which case the transmitted signal will be correspondingly changed.

The movable contact 50 and its actuating mechanism may be positioned between the repeater elements 12 and 20 and the casing 10 or in an extension 79 formed in or fixed to said casing (see Fig. 2). The engagement of contact 50 with the contacts 43 may be employed to control any suitable oscillatory transmitting circuit, that shown in Fig. 4 being shown merely by way of example. The circuit is of a usual type including an antenna circuit 80, a tuned grid circuit 81, a plate circuit 82 and a filament circuit 83. Impulses are sent out whenever contact is made at 85, shown diagrammatically as a switch, but which corresponds to the contacts 50 and 43. To render the signals audible in crystal detector sets, which rectify the waves as received and hence result only in a single click whether the engagement between contact 50 and contact 43 was long or short, there is provided an interrupter in the form of a buzzer 90 adapted to break the current at regular intervals and thus give an interrupted current in the respective circuit throughout the engagement of contact 50 with a contact 43. Thus engagement of contact 50 with a long contact 43 would yield a long buzz in the receiving circuit, while the engagement of said contact 50 with a short contact 43 would yield a short buzz in the receiving circuit. In this manner these signals may be received in a crystal receiving set.

As indicated hereinbefore the signals may be received in some suitable wireless receiving unit which preferably has combined therewith a radio direction finder so that the operator can tell at once not only the name, speed and course of the sending vessel but also the direction of said vessel relative to the receiving vessel or station. With this information the position and movements of the sending vessel may be readily determined. The radio direction finder may take the form shown in said application Ser. No. 640,423, i. e., a coil mounted for rotation about a vertical axis and adapted to be turned until a minimum signal is received. In this position the plane of the coil is perpendicular to the direction of the radio waves. A suitable azimuth indicator may be operated by the turning of the coil, said indicator being positioned preferably adjacent to, or forming part of, the radio receiving instrument so that the operator can obtain all essential data at one place.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is, 1. In combination, a dirigible craft having a course indicator, and automatic means governed thereby for periodically transmitting a wireless signal corresponding to the position of said indicator.

2. In combination with a dirigible craft, a speed indicator, and automatic means governed thereby for periodically transmitting a wireless signal corresponding to the position of said indicator.

3. In combination, a compass-controlled member adapted to be actuated in accordance with the movements of a craft, a wireless transmission system incorporated therein, and means whereby said system is actuated in accordance with the position of said member.

4. In combination, a repeater compass adapted to be actuated in accordance with the movements of a craft, a wireless transmission system incorporated therein, and means whereby said system is actuated periodically in accordance with the position of said device.

5. In combination with a master compass, of a repeater device controlled thereby and actuated to a plurality of positions in accordance with the movements of a craft, a wireless transmission system thereon, means whereby said system is operated in each of the positions of said device, and means whereby said system transmits a designating signal for each position of said device.

6. In combination, a plurality of members each actuated to a plurality of positions by the movements of a craft, a wireless transmission system, means whereby said system is operated by each of said members successively, and means whereby said system transmits a designating signal for each position of each of said members.

7. In combination, a compass-controlled part, a plurality of members, certain of said members being fixed and the other members controlled by said compass-controlled part, a wireless transmission system, means whereby said system is operated by each of said members successively, and means whereby said system transmits a designating signal for each fixed member and for different positions of each of said movable members.

8. In combination, a plurality of members, certain of said members being fixed and the other members adapted to be actuated to a plurality of positions by the heading of a craft, a wireless transmission system, means whereby said system is operated periodically by each of said members successively, and means whereby said system transmits a designating signal for each fixed member and for different positions of each of said movable members.

9. In combination, a fixed member, a compass-controlled part, a member actuated to a plurality of positions by said compass-controlled part, a speed indicator, a member actuated to a plurality of positions by said speed indicator, a wireless transmission system, means whereby said system is operated periodically by each of said members successively, means whereby said system transmits a designating signal for each position of each of said movable means, and means whereby said system transmits a signal designating the craft's call when operated by said fixed member.

10. In combination, a member adapted to be actuated to a plurality of positions in accordance with the movements of a craft, a wireless transmission system including a movable contact, said member having a plurality of sets of contacts, means whereby one of said sets is brought into cooperative relation to said movable contact in each position of said member, means for reciprocating said movable contact, and means for operating said movable contact over the set of contacts in cooperating position, during one stroke of each reciprocation, to operate said wireless system and transmit a signal.

11. In combination, a member adapted to be actuated to a plurality of positions in accordance with the movements of a craft, a wireless transmission system including a movable contact, said member having a plurality of sets of contacts, means whereby one of said sets is brought into cooperative relation to said movable contact in each position of said member, means for reciprocating said movable contact, means for operating said movable contact over the set of contacts in cooperating position, during one stroke of each reciprocation, to operate said wireless system and transmit a signal, and means for rendering said movable contact ineffective during the other stroke of each reciprocation.

12. In combination, a member adapted to be actuated to a plurality of positions, a movable contact, said member having a plurality of sets of contacts, and means for insuring a proper cooperating position between one of the sets of contacts and the movable contact throughout the excursion of the said movable contact.

13. In combination, a member adapted to be actuated to a plurality of positions in accordance with the movements of the craft, a movable contact, said member having a plurality of sets of contacts, and means for insuring a proper cooperating position between one of the sets of contacts and the movable contact throughout the excursion of the said movable contact.

14. In combination, a member adapted to be actuated to a plurality of positions in accordance with the movements of the craft, a wireless transmission system including a movable contact, said member having a plurality of sets of contacts, means whereby one of said sets is brought into cooperative relation to said movable contact in each position of said member, means for operating said movable contact over the set of contacts in cooperating position to operate said wireless system and transmit a signal, and means for insuring a proper cooperating position between one of the sets of contacts and the movable contact throughout the excursion of said movable contact.

15. In combination, a member adapted to be actuated to a plurality of positions in accordance with the movements of a craft, a wireless transmission system including a movable contact, said member having a plurality of sets of contacts, means whereby one of said sets is brought into cooperative relation to said movable contact in each position of said member, means for operating said movable contact over the set of contacts in cooperating position to operate said wireless system and transmit a signal, and means for insuring cooperation between the set of contacts in cooperating position and the movable contact.

16. In combination with a gyroscopic compass for ships, an indicator operated thereby to a plurality of positions to indicate the heading of the craft, a wireless transmission system mounted on said indicator, and means whereby said system is operated in each of the positions of said indicator.

17. In combination, a repeater compass indicator adapted to be operated to a plurality of positions to indicate the movements of the craft, a wireless transmission system mounted on said indicator, and means whereby said system is operated periodically in each of the positions of said indicator.

In testimony whereof I have affixed my signature.

ELMER A. SPERRY.